United States Patent
Johnson

[15] 3,635,672
[45] Jan. 18, 1972

[54] METHOD OF GASIFYING CARBONACEOUS MATERIALS TO A CARBON MONOXIDE FUEL GAS PRODUCT

[72] Inventor: Cecil J. Johnson, Columbia City, Ind.
[73] Assignee: Total Energy Corporation, Columbia City, Ind.
[22] Filed: Mar. 25, 1969
[21] Appl. No.: 810,101

[52] U.S. Cl. .................................. 23/204 M, 23/277
[51] Int. Cl. ........................... C01b 31/18, C10b 1/04
[58] Field of Search ........................... 23/204 M, 2 C

[56] References Cited

UNITED STATES PATENTS 3,046,093  7/1962  Alexander .......................... 23/204

*Primary Examiner*—Oscar R. Vertiz
*Assistant Examiner*—Hoke S. Miller
*Attorney*—John J. Byrne

[57] ABSTRACT

A method of gasifying coke, carbon, char or other carbonaceous materials by passing a mixture of carbon dioxide, carbon monoxide and oxygen or oxygen containing gases through a bed of the carbonaceous materials. The temperature of the gasification process is regulated and maintained by adding additional carbon monoxide and oxygen or oxygen containing gases at selected points in the process.

9 Claims, 2 Drawing Figures

METHOD OF GASIFYING CARBONACEOUS MATERIALS TO A CARBON MONOXIDE FUEL GAS PRODUCT

This invention relates to a method and apparatus for gasifying carbon, coke, char, and other carbonaceous materials by using a mixture of carbon dioxide, carbon monoxide and oxygen or oxygen-containing gases at a sufficient temperature level to enrich the concentration of carbon monoxide in the effluent gases.

There is increasing concern today with the pollution of the atmosphere in which we live. Atmospheric pollution is quite often caused by the burning of high-sulphur content, carbonaceous material or the like whereby the effluent gases contain a substantial amount of sulphur products. To remedy this situation, this invention includes a method whereby the sulphur-containing carbonaceous material is gasified to produce carbon monoxide, carbon monoxide is desulphurized and then used as heat energy for mechanical or electrical power. For example, the desulphurized hot carbon monoxide gas may be used as a power source for internal combustion engines, gas turbines, chemical processes, steam boilers, and other fuel-consuming devices. Since the carbon monoxide has been desulphurized, a minimum of pollutants is added to the atmosphere.

It is well known to gasify carbonaceous material, such as coke, by flowing the coke downwardly through a retort and passing carbon dioxide upwardly through the moving bed of coke. The reaction is $CO_2 + C + 74,960$ Btu/lb. mol $\rightarrow 2CO$. To date, however, no economical and adequate temperature control methods or devices are available which will provide for maximum utilization of carbon dioxide to gasify carbonaceous materials. The above equation shows that carbon dioxide gasification of carbon is very endothermic. The problem is to provide the adequate heat necessary for the reaction to go to completion. Heretofore, however, no reliable means have been provided for adequately and selectively controlling the temperature. The heat must be regulated not only for complete combustion but for other purposes. Carbon monoxide reactions cause excessive temperatures which damage the catalyst and environmental metals and refractory containers. In some cases, the product gases are at a temperature that is either too high or too low for supplemental operations or the product gases contain a concentration of carbon monoxide that is too low.

In the present invention, a novel method is disclosed wherein sufficient amounts of oxygen or oxygen-containing gases and carbon monoxide are added to selected combustion or vapor zones in a gasification retort to supply adequate exothermic heat replacing the heat consumed in the reaction between carbon dioxide and carbon. The present invention provides a method of quantitatively burning oxygen and carbon monoxide to counterbalance the primary endothermic reaction of gasifying coke with carbon dioxide to yield carbon monoxide fuel gas. The combustion zones are created throughout a downwardly moving bed of hot carbonaceous granular material by means of suitably placed baffles in the retort. The addition of oxygen and oxygen-containing gases and carbon monoxide to these vapor zones creates the reaction of $CO + 1/2O_2 \rightarrow CO_2 + 122,000$ Btu/lb. mol. The heat supplied by this reaction more than counterbalances the aforementioned endothermic reaction of carbon dioxide and carbon. The coke flows by gravity downwardly in a mixing bed whereas the gaseous charged combustion products flow countercurrently upward thereby providing excellent and instant heat exchange efficiency as required for optimum temperature control throughout the gasifier. Suitable temperature-sensing means are provided at spaced points throughout the length of the retort sensing the heat of the carbonaceous bed at those points and controlling suitable inflow valves regulating the amount of carbon monoxide and oxygen being fed to the vapor zones. It is to be understood that the baffle plates separate the retort into a plurality of sections, each having a bed of carbonaceous materials, a vapor zone, temperature sensors, and valved inlets for oxygen and carbon monoxide gases.

The supply of the supplemental oxygen and carbon monoxide is controlled such that sufficient proportions of the two gases are added to supply the necessary amount of heat for adequate control of temperatures thereby insuring optimum operations.

These and other objects of the invention will become more apparent to those skilled in the art by reference to the following detailed description when viewed in light of the accompanying drawings wherein.

Figure 1:
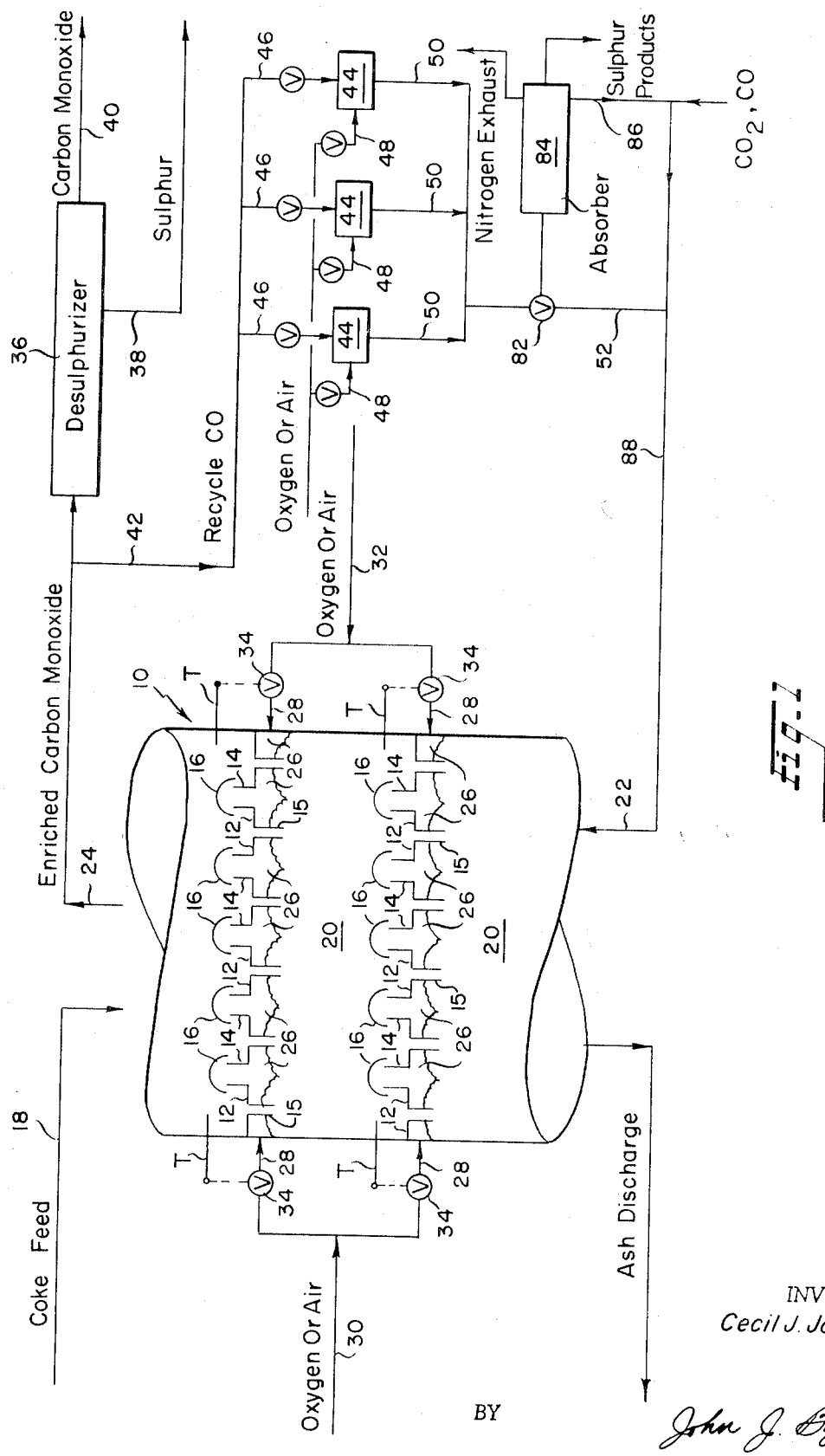
FIG. 1 shows schematically the process and apparatus of this invention.

Referring now to FIG. 1, 10 indicates generally a retort wherein the gasification of carbonaceous materials takes place. Inside the retort at spaced intervals baffles 12 are provided in the form of plates extending across the retort. Each baffle 12 is provided with a plurality of upwardly extending openings or risers 14 having hoods 16 protecting the openings 14 from downwardly flowing coke granules. Hot coke is fed into the retort from a suitable source, as indicated by the arrow 18. The coke granules flow downwardly past the hoods 16 through tubular downcomers 15 in the baffles 12 to form hot granular beds 20 beneath each baffle. A mixture of carbon dioxide, carbon monoxide and other inert gases is fed upwardly through the retort chamber 10 and through the granular coke beds 20. The carbon dioxide reacts with the carbon in the hot granules to produce carbon monoxide, which is taken off the top of the retort as indicated by the arrow 24. It is to be understood that the rate of feed of the carbon dioxide, carbon monoxide and other inert gases at 22 controls the gasification rate.

As the coke granules flow downwardly through the retort and past the respective baffles 12, a vapor zone or combustion chamber 26 is created under each baffle above the surface of each hot granular coke bed. Each vapor zone extends completely across the retort above each bed interrupted only by the downcomers 15. Communicating with the vapor zone or combustion chamber 26 under each baffle are suitable conduit means shown schematically and indicated by the numeral 28. Supplementary oxygen, oxygen-containing gases (air) and carbon monoxide are fed through the conduits 28 to the combustion chambers or vapor zones 26 from suitable sources as indicated by the arrows 30 and 32. Positioned in each granular bed immediately above the succeeding set of baffles is a temperature-responsive element T. In accordance with predetermined parameters, the temperature-responsive elements T open or close valves 34 which control the amount of oxygen, air, and carbon monoxide fed to the combustion chambers or vapor zones 26.

In operation hot coke granules or other carbonaceous granules are fed into the retort 10 as indicated by the arrow 18. The coke granules flow downwardly past the baffle members 12 through downcomers 15 forming a plurality of granular coke beds defined by the space between successive baffles 12. A mixture of hot carbon dioxide, carbon monoxide and other inert gases is fed upwardly through the granular beds, through the risers 14, past the baffles and out of the retort 10 as indicated by the arrow 24, in the form of carbon monoxide. The endothermic reaction $CO_2 + C + 74,960$ Btu/lb. mol $\rightarrow CO$ occurs at a rate which is regulated by the amount of carbon monoxide, carbon dioxide and other inert gases introduced to the granular beds at 22. In order to counteract the loss of heat caused by the endothermic reaction described above and in order to properly maintain the temperature of the granular coke beds for a more complete reaction and for a greater yield of carbon monoxide, supplementary oxygen, air and carbon monoxide is introduced from sources 30 and 32 through valves 34 and conduits 28 into combustion chambers or vapor zones 26. In the zones 26 the reaction $1/2O_2 + CO \rightarrow CO_2 + 122,000$ Btu/lb. mol takes place giving off the indicated amount of heat and thereby supplementing the heat lost in the endothermic reaction between carbon dioxide and carbon.

The $CO_2$ product of the above reaction flows upwardly through the risers 14 into the immediate granular coke bed. The temperature-responsive members T regulate the valves 34 in a predetermined manner responsive to the temperature of the granular coke bed 20 immediately preceding a particular baffle 12. In this manner, selective gasification of carbonaceous materials occurs at a controlled temperature rate thereby enhancing a more efficient reaction between carbon dioxide and carbon to produce carbon monoxide.

The carbon monoxide is taken out of the retort at 24 and passed through a desulfurizer 36. The sulfur is taken off at 38 and the purified carbon monoxide is taken off at 40 and transported for the various uses mentioned earlier in this specification. A portion of the carbon monoxide leaving the retort 10 is recycled prior to reaching the desulfurizer 36 and is taken off at 42. The recycled carbon monoxide is passed through suitable combustion chambers 44 via conduits 46. Oxygen or air or other oxygen-containing gases are injected into the combustion chambers 44 through lines 48 and are reacted with the carbon monoxide to produce carbon dioxide. The $CO_2$ is recycled through lines 50, 52, 88 and 22 and is mixed in with a fresh feed of carbon dioxide and carbon monoxide. As may be preferred, air instead of pure oxygen may be used in the combustion chambers 44. When air is used, the $CO_2$ leaving the chambers 44 may be diverted by means of valve 82 to an absorber shown schematically at 84. The undesirable nitrogen and sulfur constituents originally in the air used are taken off in the absorber 84 and the extracted $CO_2$ is recycled through line 86 and intermixed with fresh $CO_2$ from an outside source in line 88. A stripper may be used in conjunction with the absorber to reconstitute the absorbent.

Figure 2:
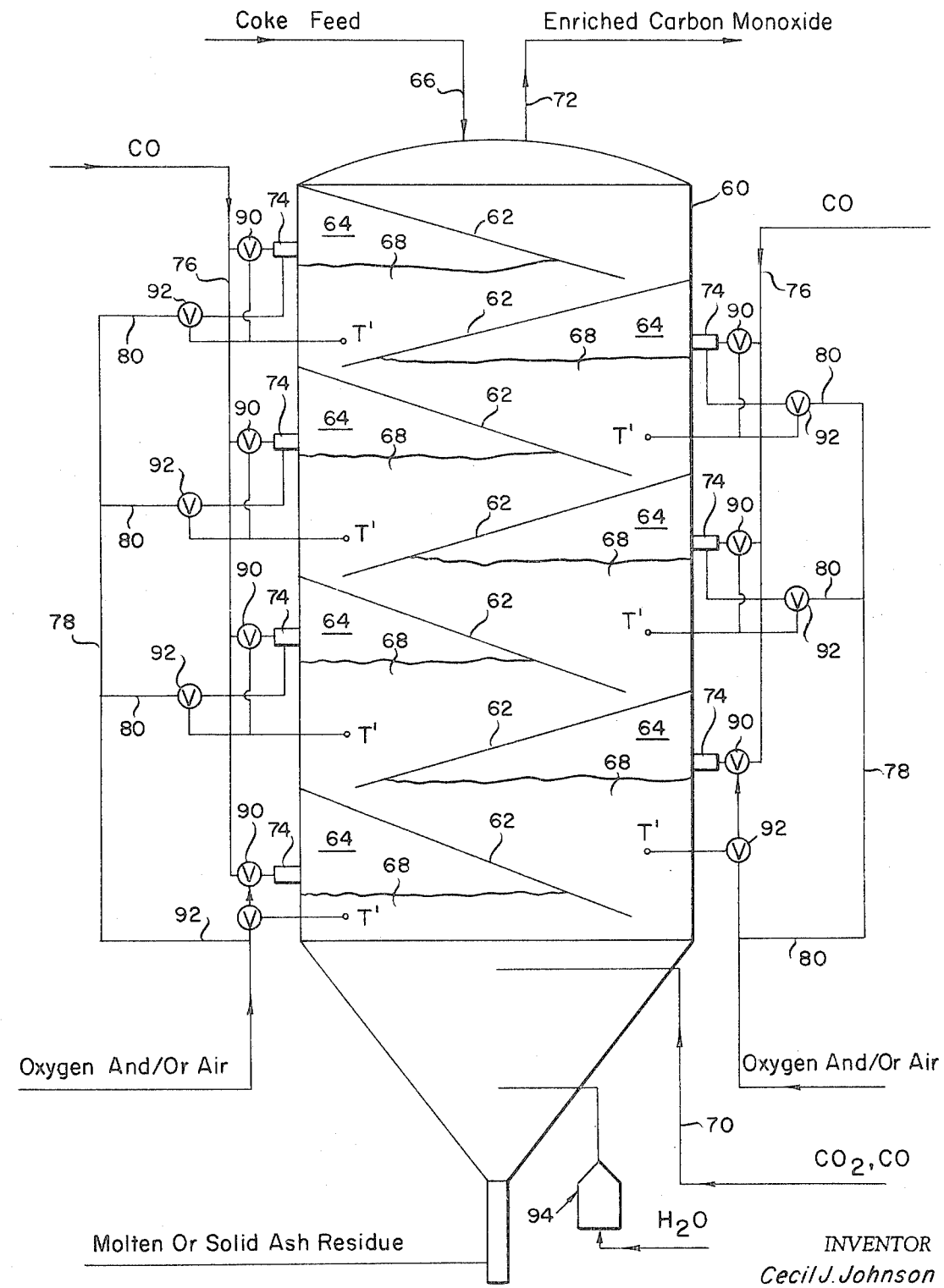
FIG. 2 is a schematic representation of a second embodiment of this invention.

FIG. 2 shows a second embodiment of the gasifier of this invention. The retort 60 is provided with sloping baffle plates 62. The baffle plates operate similarly to the baffle plates of the retort shown in FIG. 1 and create vapor spaces 64 in the granular beds 68 introduced to the retort at 66. Carbon dioxide and carbon monoxide and other suitable inert gases are introduced to the retort 70. The carbon dioxide flowing upwardly through the hot coke granules reacts with the carbon to produce carbon monoxide which is taken off at 72. Means are provided for supplementing the flow of $CO_2$ in a similar manner as in the device and method of FIG. 1. Adjacent each vapor zone 64 and communicating therewith is a combustion chamber 75. Carbon monoxide is introduced to each combustion chamber by means of conduit 76 and oxygen or air is introduced to each combustion chamber by conduits 78 and 80. The CO and $O_2$ react in combustion chamber to form hot $CO_2$. The CO and $O_2$ may be superheated before reaching the combustion chamber. Further, since the reaction is exothermic, hot carbon dioxide is supplied to the vapor zone 64 to enhance the reaction between the carbon dioxide introduced to the system at 70 and the granular carbonaceous materials in the retort. Note that the carbon dioxide contacts the surface of the adjacent coke granular bed where the heat is greatest and the reaction will be the most efficient. Temperature-responsive means are provided as indicated in FIG. 2 by T'. T' controls the flow of carbon monoxide and oxygen to the combustion chambers 74 in response to the heat of the granular coke bed 68 by regulating valves 90 and 92. In the embodiment of FIG. 1 the reaction between the CO and $O_2$ takes place in the vapor zones 26. In the embodiment of FIG. 2 the reaction occurs in the combustion chambers 74 prior to the gases entering the vapor zones 64.

Reference is now made to the following examples showing the results of the process disclosed herein in tabular form.

| Product desired | Example 1, carbon monoxide | Example 2, carbon monoxide |
|---|---|---|
| Coke feed, lbs./hr | 1 | 1 |
| $CO_2$ feed, lbs./hr | 4 | 4 |
| Steam feed, lbs./hr | | |
| CO feed, lbs./hr | 1 | 1 |
| Oxygen feed, lbs./hr | 0.7 | 0.7 |
| Gasifier temperature, °F | 2,000 | 1,800 |
| Carbon monoxide yield, lbs./hr | 5.1 | 4.6 |
| Gasifier pressure, p.s.i.g | 100 | 100 |

In both embodiments, as the carbon reacts with the carbon dioxide, the residue or ashes formed therein continue to flow downwardly past the baffle plates 12 in FIG. 1 and 62 in FIG. 2 and out of the bottom of the retort to suitable ash collection means. It is to be understood that the carbon monoxide taken off of the retort 60 of FIG. 2 is desulfurized and a portion is recycled through the same steps as described in the process of the embodiment of FIG. 1.

The carbon dioxide, carbon monoxide and other inert gases that are introduced at the bottom of the retort in each embodiment are under high pressure such that the gas flows upwardly at a rather high velocity. Such upward flow partially fluidizes the granular coke bed, facilitating the downward flow of the granular material past the baffles and out of the bottom of the retort.

If desired, steam may be admitted to the bottom of the retort, as indicated in FIG. 2 at 94, to react with the carbonaceous materials to thereby form hydrogen which may be taken off at the top of the retort. Further, a secondary retort may be provided in combination with the retort shown in either FIG. 1 or FIG. 2 such that one may be employed in a system having high ash content and the other may be employed in a system wherein the coke used therein has a low ash content, the latter giving off a greater concentration of carbon monoxide than the former. In an overall system, however, the two may be used for different grades of coke and means may be provided for combining the carbon monoxide taken off from the primary and secondary retorts and for passing the combined carbon monoxide gases through a desulfurizer as explained earlier in this specification.

In a general manner, while there have been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. A method of gasifying carbonaceous materials comprising the steps of passing a main flow of superheated carbon dioxide through at least one bed of carbonaceous materials whereby the carbon dioxide reacts with the carbon therein to form carbon monoxide, creating at least one vapor zone in the bed of carbonaceous materials, supplementing the main flow of carbon dioxide with the selective introduction of oxygen to said vapor zones for selective reaction with carbon monoxide therein substantially simultaneous to the carbon dioxide-carbon reaction to produce additional hot carbon dioxide gas, whereby additional heat and carbon dioxide is supplied in the vapor zone for the endothermic reaction of carbon dioxide gas and carbon.

2. A method in accordance with claim 1 wherein the carbonaceous material is coal.

3. A method in accordance with claim 1 wherein the carbonaceous material is coal char.

4. A method in accordance with claim 1 wherein the carbonaceous material is petroleum coke.

5. A method in accordance with claim 1 wherein the carbonaceous material is a mixture of coal char and petroleum coke.

6. The method of claim 1 further comprising the step of automatically regulating the amount of oxygen admitted to the vapor zone in response to the temperature of the bed of carbonaceous material.

7. The method of claim 1 and including the step of recycling a portion of the enriched carbon monoxide by first passing the enriched carbon monoxide through combustion zones and therein reacting the enriched carbon monoxide with air, passing the product of the reaction through an absorber to remove the nitrogen components and then introducing the product to the main flow of carbon dioxide.

8. A method of gasifying carbonaceous materials comprising the steps of passing a main flow of superheated carbon dioxide through a bed of carbonaceous materials whereby the carbon dioxide reacts with the carbonaceous material to form carbon monoxide, creating vapor zones in the bed of carbonaceous materials, supplementing the main flow of carbon dioxide with the selective reaction of carbon monoxide and oxygen to produce additional hot carbon dioxide gas whereby additional heat is supplied for the reaction of carbon dioxide gas at said vapor zones with the carbonaceous material thereby forming enriched carbon monoxide.

9. The method of claim 8 wherein there are a plurality of beds of carbonaceous material and vapor zones disposed in alternating, stacked vertical arrangement.

* * * * *